Dec. 15, 1959   R. C. ZEIDLER ET AL   2,917,001
HYDRODYNAMIC COUPLING

Filed June 16, 1951   5 Sheets-Sheet 1

Inventors:
Reinhold C. Zeidler
and Daniel W. Lysett
By

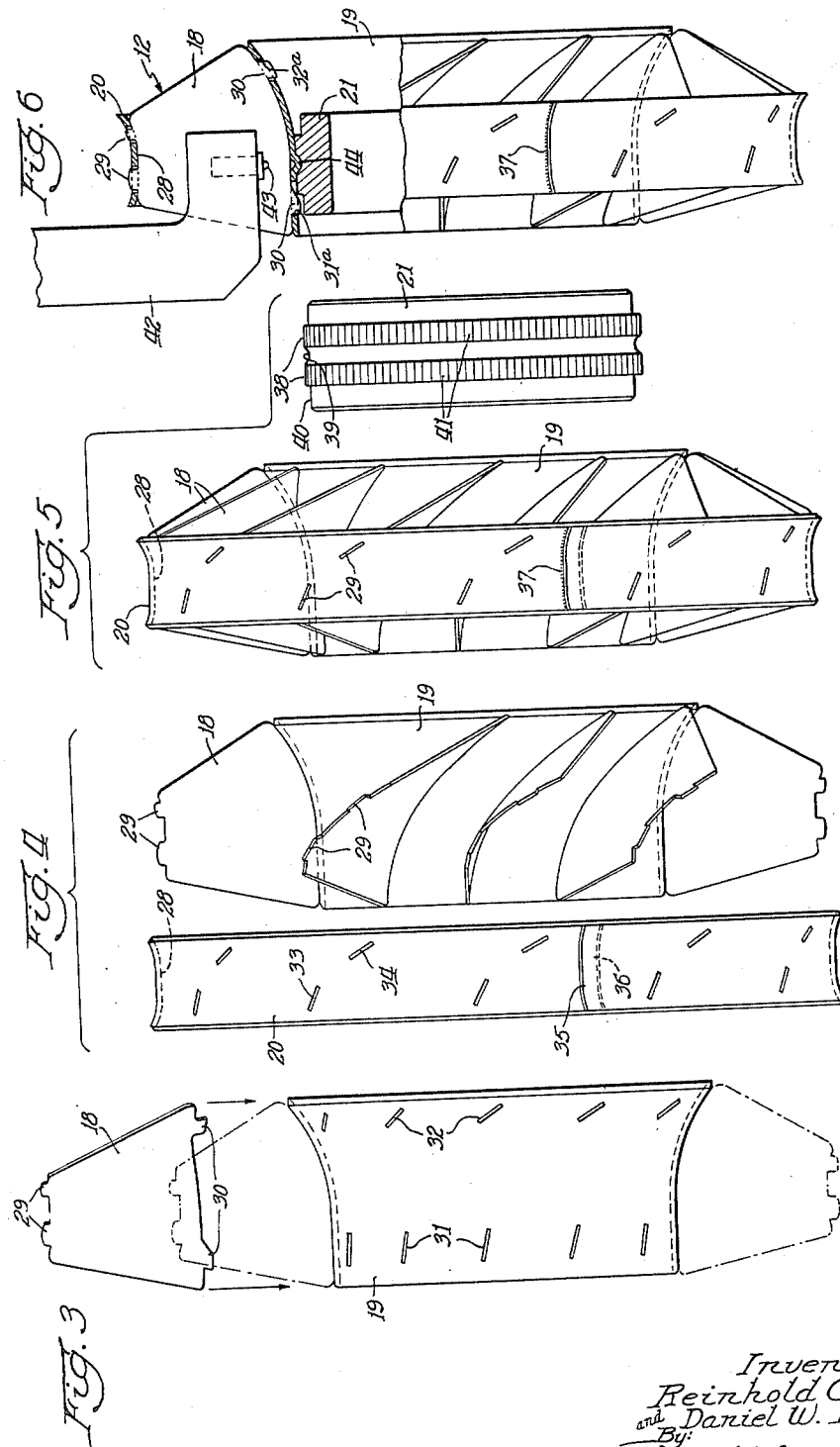

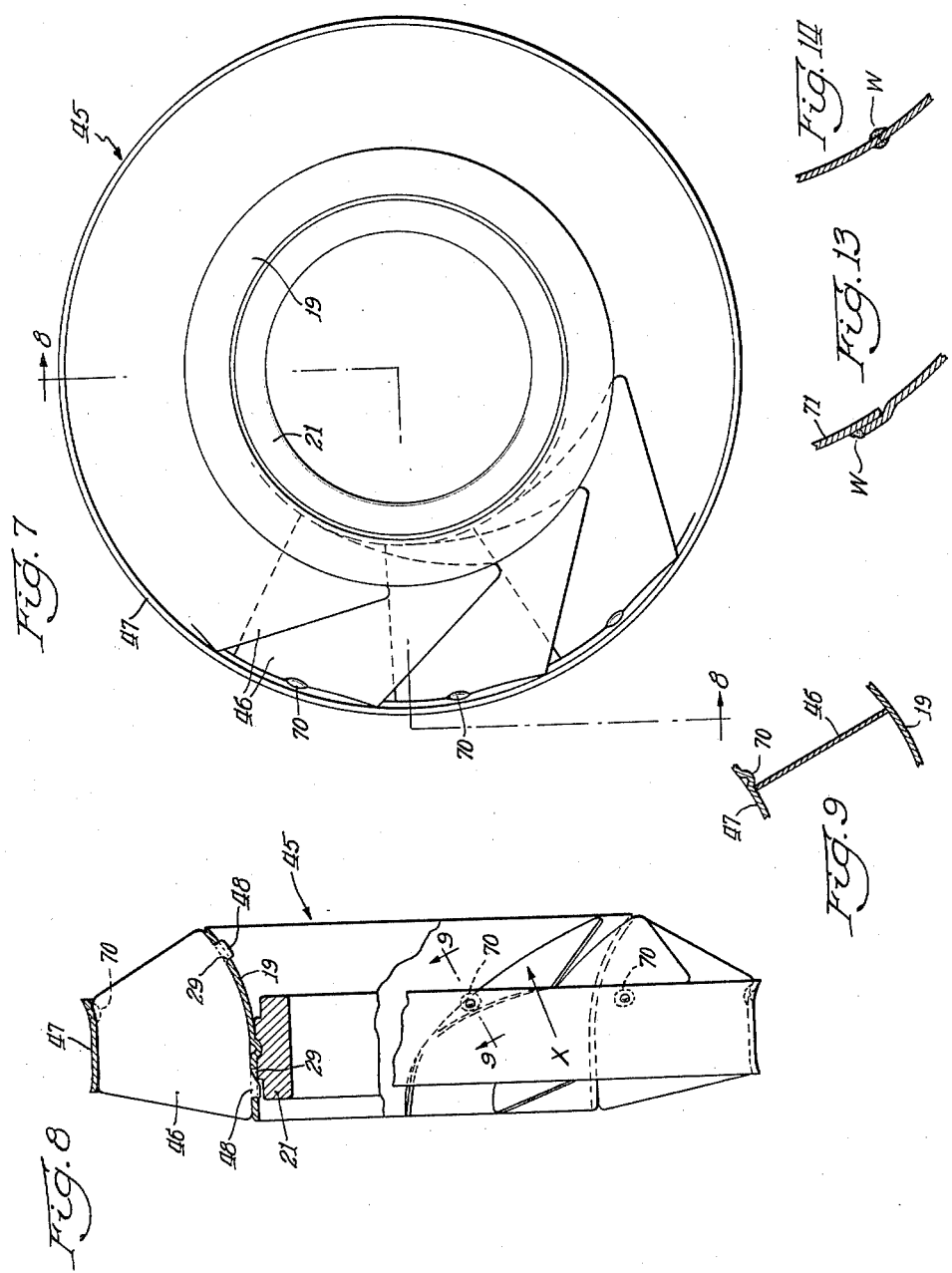

Dec. 15, 1959
R. C. ZEIDLER ET AL
2,917,001
HYDRODYNAMIC COUPLING
Filed June 16, 1951
5 Sheets—Sheet 4
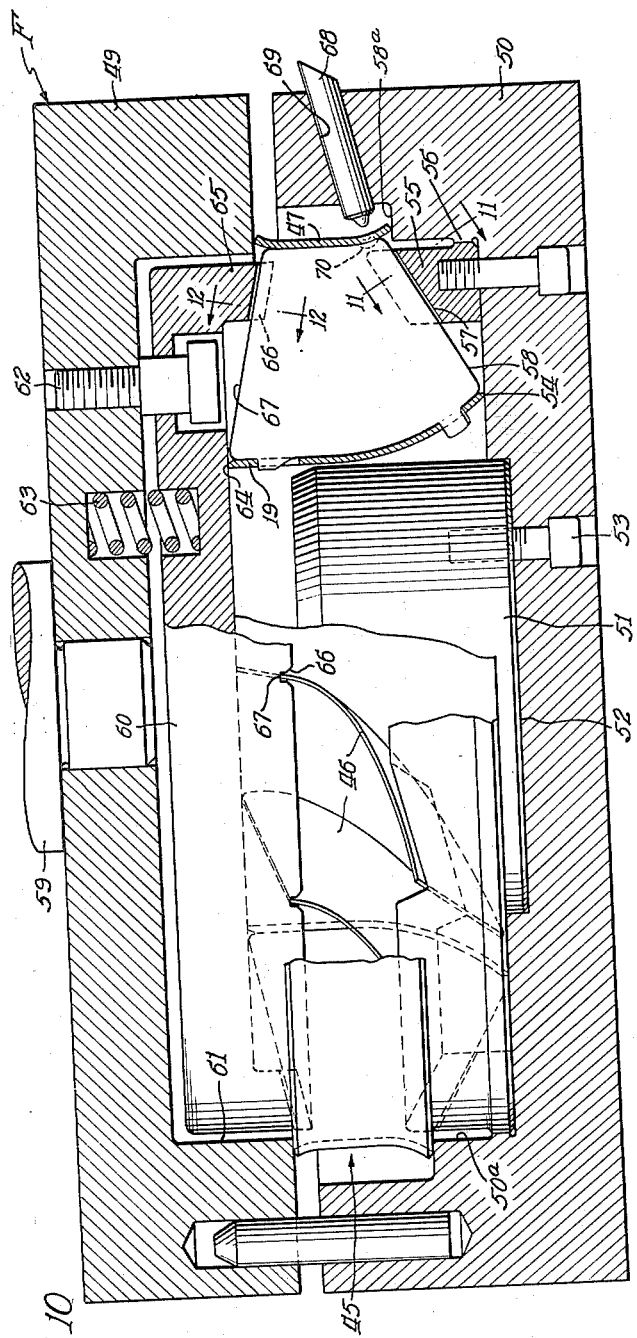
Inventors:
Reinhold C. Zeidler
and Daniel W. Lysett
By:

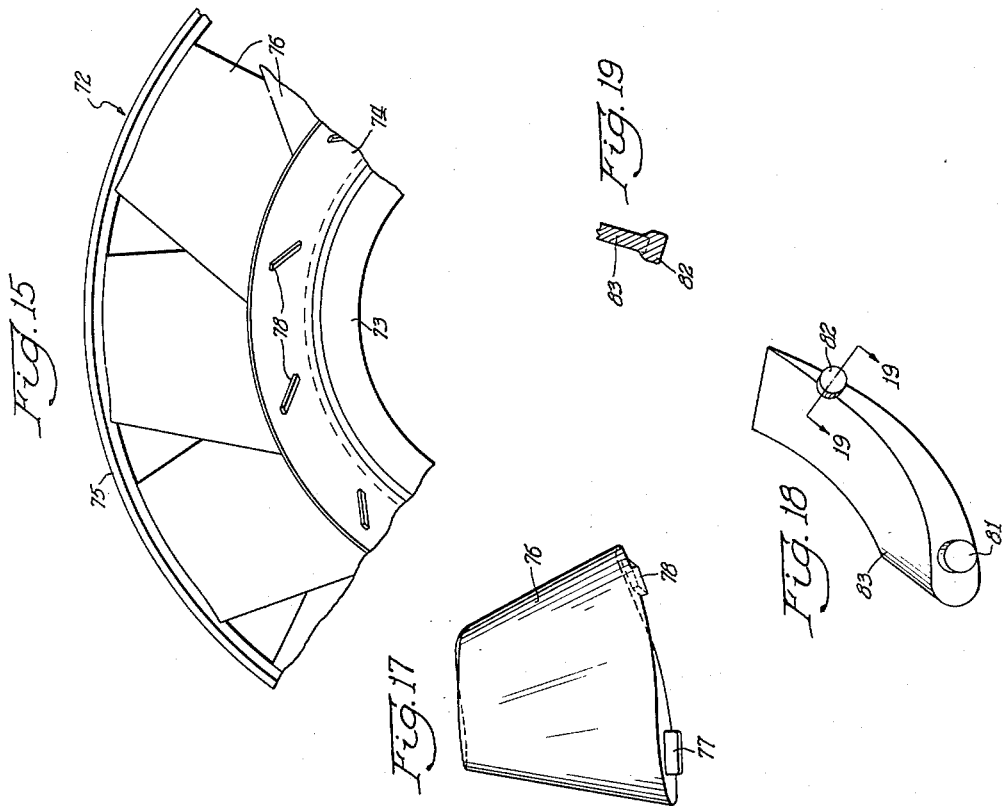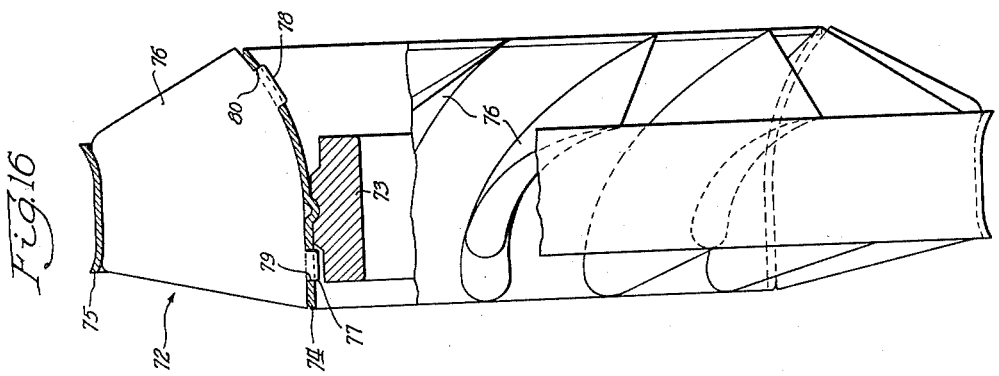

United States Patent Office 2,917,001
Patented Dec. 15, 1959

2,917,001

HYDRODYNAMIC COUPLING

Reinhold C. Zeidler, Detroit, and Daniel W. Lysett, Utica, Mich., assignors to Borg-Warner Corporation, Chicago, Ill., a corporation of Illinois Application June 16, 1951, Serial No. 232,034

8 Claims. (Cl. 103—115)

This invention relates to hydrodynamic couplings, and more particularly to such couplings for transmitting variable torque between vaned elements placed adjacent each other and operating by circulation of fluid in a closed toroidal path defined by the vaned elements.

An object of the invention is to provide improved vaned elements of hydrodynamic couplings, which vaned elements are simple and rugged in construction, light in weight, efficient in operation, and easy and inexpensive to fabricate.

Another object of the invention is to provide improved vaned elements of hydrodynamic couplings and new and novel methods of an apparatus for assembling the same.

Another object of the invention is to provide improved vaned elements of hydrodynamic couplings and methods of making the same wherein the component parts of the vane assembly of each vaned element are formed of sheet metal and mechanically interlocked together to provide a strong, simple and inexpensive unitary structure.

Another object of the invention is to provide vaned elements of hydrodynamic couplings each including a vane assembly, and a hub mounting the assembly and removably fixed thereto for replacement by another hub without disrupting the component parts of the vaned assembly.

Still another object of the invention is to provide improved fabricated vaned elements of hydrodynamic couplings of the torque converting type comprising a shell, a core ring, and curved vanes extending between the shell and core ring, these component parts of each element being formed as individual metal stampings and retained in assembly by novel mechanical interlocking portions of the parts, including tabs on the vanes inserted within openings in the shell and core ring, the core ring being formed and arranged to be the sole means for retaining the vane tabs in the openings in the shell and core ring.

A further object of the invention is to provide improved vaned elements of couplings of the torque converting type described wherein the core rings of the vaned elements are provided with projections positively positioning the vanes to prevent distortion of the vanes, and thereby the curvatures of the vanes, in the assembly of the shell, core ring, and vanes.

A more specific object of the invention is to provide improved vaned stator or reaction elements of fluid couplings of the torque converting type described wherein each element comprises vanes positioned between and mechanically locked to an annular shell and core ring, in concentric telescoping relation, by tabs on the vanes inserted in slots in the shell, the core rings surrounding and engaging the radially outer edges of the vanes to maintain the vanes, core ring, and shell in assembly.

Additional objects, aims and advantages of the invention contemplated herein will be apparent to persons skilled in the art after the construction and assembling of the present vaned elements of hydrodynamic couplings is understood from the following description taken together with the accompanying drawings in which.

Figure 1:
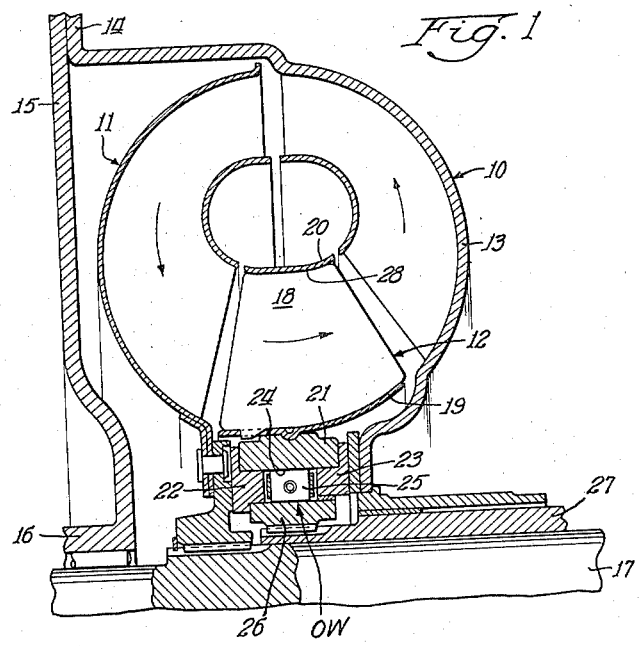
Figure 1 is an axial section of a fragmentary portion, preferably the upper half of the vaned impeller, turbine and stator elements of a hydrodynamic coupling of the torque converting type.
Figure 2:
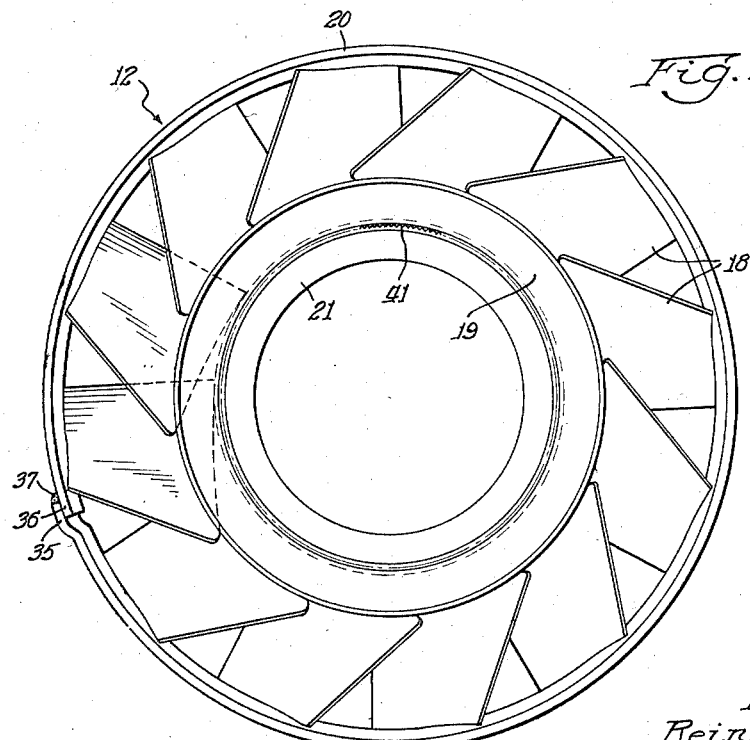
Fig. 2 is an enlarged side elevational view of the vaned stator element shown in Fig. 1 and as seen from the right in Fig. 1, the stator element embodying vanes of uniform thickness.

Figs. 3, 4, 5 and 6 are views illustrating a preferred method, including the various successive steps required, for assembling the vanes, core ring, shell, and hub of the vaned stator element shown in Figs. 1 and 2; Fig. 3 illustrating the vane and shell prior to connecting the vanes to the shell; Fig. 4, the core ring, and the vane and shell assembly prior to connecting the core ring to the assembly; Fig. 5, the hub prior to the assembly of the hub to the vane, shell and core ring assembly; and Fig. 6 illustrating the assembled stator element, and a fixture for fixing the hub to the shell to prevent relative axial movement thereof;

Fig. 7 is an end elevation of a vaned stator element illustrating a modification of the invention;

Fig. 8 is a side elevation, partly in section, of the stator element shown in Fig. 7, said section being taken on lines 8—8 of Fig. 7 and looking in the direction of the arrows;

Fig. 9 is a sectional view of a portion of the vaned element shown in Figs. 7 and 8, said section being taken on line 9—9 of Fig. 8;

Fig. 10 is a side elevation, partly in section, of the stator element, shown in Figs. 7, 8 and 9, positioned in a fixture for assembling the core ring to the vanes;

Figs. 11 and 12 are sectional views taken on lines 11—11 and 12—12, respectively, of Fig. 10.

Fig. 13 is a view of portions of a core ring illustrating a modification of the core ring shown in Figs. 7-10, inclusive;

Fig. 14 is a view of portions of a core ring illustrating another modification of the core ring shown in Figs. 7-10, inclusive;

Figs. 15-19, inclusive, illustrate a vaned stator element embodying vanes of cast metal and of airfoil shape, Fig. 15 being an end elevation of a fragmentary portion of the element; Fig. 16, a side elevation, partly in section, of the element; Fig. 17, a side elevation of one of the vanes embodying rectangular tabs; Fig. 18, an edge of a vane embodying round tabs, and Fig. 19, a sectional view of a portion of the vane shown in Fig. 18, said section being taken on line 19—19 of Fig. 18 and looking in the direction of the arrows.

The drawings are to be understood as being more or less of a schematic character for the purpose of disclosing typical or preferred forms of the improvements which are contemplated herein; in these drawings, like reference characters identify the same parts in the different views.

Referring now to a detailed description of the hydrodynamic coupling of the torque converting type shown in Fig. 1 of the drawings, the coupling comprises a vaned element 10 generally designated as a pump or impeller, a vaned element 11 in the form of a turbine or runner, and a vaned reaction element or stator indicated at 12, the impeller 10 including a semi-toroidal shell 13 having at its outer edge a flange 14, the flange 14 being secured to a driving plate 15 connected to an engine driven shaft 16. The hydrodynamic coupling functions to multiply torque between the engine driven shaft 16 and a driven shaft 17 connected to the turbine 11, the vanes of the impeller 10 imparting energy to a body of fluid circulating in a toroidal path, as indicated by the arrows, within the coupling, the turbine receiving the energy from the fluid, and the stator 12 being held from rotation by a one-way brake OW to provide the necessary reaction for multiplication of torque by the hydrodynamic coupling. As is well known in the art, changes in the direction of the fluid flowing from the turbine to the stator during decreasing torque multiplication of the coupling will eventually effect rotation of the stator with the impeller and turbine, i.e. upon the fluid being directed against the backs of the vanes of the stator, the one-way brake will release the stator for rotation.

Figs. 1–6, inclusive, illustrate an embodiment of the present invention directed to the structure of the component parts of the stator or reaction member 12 and to the method of assembling the same. The stator element comprises a vaned assembly comprising a plurality of vanes 18, an arcuate supporting member or shell 19 and an annular shroud or core ring 20, the vanes being connected to the supporting member 19 and the core ring 20, as will be presently described. The stator also comprises a steel hub 21 rotatably supported on two annular L-section bearing members 22 and 23 and between which is disposed the one-way brake OW, which may be of the sprag type as shown. The hub 21 has an internal cylindrical surface 24 providing bearing faces engaging the rings 22 and 23 and also an outer annular raceway for engagement with the sprags 25 of the one-way brake which also engage an annular inner raceway on a collar 26 splined to a stationary sleeve 27 and supporting the bearings 22 and 23 and thereby the stator on the sleeve 27.

The shell 19 and the vanes 18 of the stator 12 are formed of stamped sheet metal, preferably steel, the vanes being disposed in circumferentially equi-spaced relation about the shell 19, each vane being formed helixwise to provide opposite faces thereof with curvatures effective as a fulcrum for the fluid flowing through the torque converter to effect torque multiplication. The core ring 20 is a flexible elongated strip of metal, such as steel, and which is initially preformed to define a cross-sectional curvature, as shown in Figs. 1, 4, 5, and 6 and then bent to assume an annular or cylindrical split band so that the surface 28 thereof will surround and engage the radially outer edges or margins of the vanes, the preforming operation causing the band to be somewhat convexly curved to conform to and complement the concave curvature of each of the radially outer edges of the vanes, as shown in Figs. 1 and 6. The radially inner and outer edges of each vane 18 are provided with spaced tabs 29 and spaced tabs 30, respectively, which extend generally in the plane of the vane. The annular shell 19 has circumferentially spaced sets of axially spaced slots 31 and 32 receiving the tabs 30 on the vanes 18, and the core ring 20 is also provided with similar sets of slots 33 and 34 receiving the tabs 29 of the vanes 18.

Referring now more particularly to Figs. 3 to 6, inclusive, illustrating the component parts of the stator and the successive steps in the assembling of the stator, Fig. 3 shows the vanes about to be fitted into the supporting member or the shell 19, the vanes being individually moved toward the shell 19 to dispose the tabs 30 in the slots 31 and 32 of the shell. The tabs 30 of the vanes are spaced apart a greater distance than the distance between the slots 31 and 32 in the shell and the metal stampings, forming the vanes 18, are of a flexible character so that the vanes may be flexed to position the tabs 30 of the vanes 18 within the slots 31 and 32 of the shell 19 and, upon subsequent release of the flexed vanes, the vane tabs 30 will frictionally engage the ends of the slots in the shell at the points indicated at 31a and 32a in Fig. 6. Thus a slight interference fit is had between the two tabs 30 on each vane and the two slots 31 and 32 in the shell within which the tabs are positioned, requiring the vane to be snapped into place which also causes the radially inner edges or margins of the vanes to engage the outer surface of the shell. The vanes thus assembled are under a compression loading or preloaded which prevent the vanes from rattling or vibrating but which would permit movement of the vanes radially of the shell in the operation of the coupling.

Referring to Fig. 4, illustrating the vanes 18 and shell 19 in assembled relation and the core ring 20 prior to assembly with the vanes, it will be seen that the metal strip, forming the core ring, has been bent to assume an annular or cylindrical split band with the opposite ends of the metal strip overlapping each other. In the assembling of the core ring with the vanes, the tabs 29 on one of the vanes are received in the spaced slots 33 and 34 at one end of the elongated metal strip and the strip is then bent to insert the tabs 29 of the succeeding vanes into the slots 33 and 34 of the band, until all of the tabs 29 are received within the slots 33 and 34 of the band at which time the metal strip will assume an annular shape and engage the radially outer edges or margins of the vanes with the ends 35 and 36 of the strip in overlapping relation. The core ring is then held tightly to the vanes with a suitable clamping fixture, not shown, that applies uniform pressure on the core ring but allows an opening for the performance of a welding operation to integrally unite the ends 35 and 36 of the band. After the welding operation, the vane structure or assembly consisting of the shell 19, the vanes 18 and the core ring 20, is held in the fixture until the weld 37 is cool. As the welding operation induces a certain amount of heat into the core ring causing it to expand and the ring is held in engagement with the vanes by the fixture until the ring cools, the cooling will cause the core ring to shrink and to tightly fit the radially outer edges of the vanes to securely hold the vanes in engagement with the shell and core ring.

It will be clearly apparent that the engagement of the band with the contiguous edges of the vanes, when coupled with the complementary convex and concave curvatures of the engaged surfaces thereof and the interlocking mechanical connection afforded by the vane tabs 29 and the slots 33 and 34 of the band, will maintain the band against movement relative to the vanes and axially of the vanes and the shell 19. The relationship of the vane tabs 29 and the core ring slots being such as to prevent rotation of the core ring relative to the vanes. The band or shroud of the stator is in circumferential alignment with the core rings of the impeller and turbine so that there will be an unbroken continuity of the flow of the liquid in the converter along the surfaces of the core rings partly defining the fluid passages in the torque converter.

After the core ring 20 is thus fastened in place on the vanes, the assembly may be placed on a bench, or held by any suitable fixture, while the hub 21 is pressed into the shell 19 of the stator, as indicated in Fig. 5. It will be noted from a consideration of Fig. 5 that the annular hub 21 is provided with a cylindrical outer surface 40 having axially spaced projecting portions 38 defining a groove 39 extending circumferentially about the cylindrical outer surface 40 of the hub 21. Each of the portions 38 project radially outwardly of the surface 40 and are provided with serrations providing saw-like teeth 41 which, when the hub 21 is pressed into the shell 19, will bite into the metal of the radially inner surface of the shell to provide serrations in this surface complemental to the serrations 41 in the hub 21 to firmly interlock the hub 21 with the shell 19, as shown in Fig. 2. Experiments have proven the press fit of the hub 21 and the shell 19 and their serrated engagement is more than sufficient to transmit all of the torque necessary during the operation of the hydraulic torque converter.

It is contemplated that the hub 21 would be finish machined, serrated, induction hardened and the stress induced by the induction hardening process relieved, before the hub 21 is pressed into place with the shell 19.

Referring to Fig. 6, in the assembly of the stator, preferably there is provided a staking tool 42 of L-shape having the lower portion thereof extending between the vanes 18 and provided with a hard steel punch 43, moving the staking tool 42 radially toward the axis of the stator to indent the metal of the shell into the groove 39 in the hub 21. This staking operation is optional and may be performed at various points about the circumference of the shell 19 to provide a plurality of projections or protuberances 44 within the groove 39 of the hub 21 preventing relative axial movement of the hub and shell.

It will be seen from an inspection of Figs. 1 and 6 that the protuberances 44 will hold the hub in place and against axial movement of the shell 19 relative to the hub during operation of the hydraulic torque converter.

It will also be apparent from the above description, that in the event the hub 21 should become worn in service, or should the hub receive faulty heat treatment, or does not comply with the tolerances for its dimensions after grinding or machining, the hub 21 can be readily removed from the shell 19 by effecting axial movement of the hub 21 relative to the shell 19, by any suitable tools or a fixture functioning to press out the hub 21 from the shell 19.

More particularly, upon the application of force to the hub 21 effecting axial movement of the hub 21, relative to the shell 19, the protuberances 44 can be readily deformed and pushed into the shell 19 to force the protuberances out of the groove in the hub so that a new hub can then be installed, as previously described, with the staking operation being performed in other and new areas of the shell away from the prior indentations to provide new protuberances that will securely hold the new hub and the shell 19 against relative axial movement.

Figs. 7, 8, 9 and 10 illustrate a modified form of vaned reaction element or stator generally designated 45 and comprising the hub 21 and shell 19 connected together in the manner previously described with reference to the embodiment of the invention illustrated in Figs. 1 to 6, inclusive. The curved vanes 46 have their radially inner arcuate or convex edges engaging the concave outer surface of the shell 19 and provided with a plurality of tabs 48 formed and arranged with respect to the slots 31 and 32 in the shell 19 to extend within and have an interference fit with the slots in the shell as previously described. The stator shown in Figs. 7 to 10, inclusive, principally differs from the stator shown in the embodiment of the invention of Figs. 1 to 6, by the use of an endless core ring 47, of such diameter that, when the ring is heated to expand the ring, the ring can be passed over the radially outer edges of the vanes to surround the vane and shell assembly, and then cooled to shrink or contract the ring to tightly engage the radially outer edges of the vanes. Fastening or securing the core ring to the vanes as described obviates the necessity of slotting the ring, providing tabs on the radially outer edges of the vanes, and then wrapping the metal strip, forming the core ring, around the ring edges to insert the tabs on the vanes in slots in the core ring.

The one-piece core ring 47 may be made from flat sheet metal stock, such as steel, drawn into a shallow cup, the bottom of the cup then being pierced to provide a ring, the flange on the top edge trimmed, the ring then being subjected to a re-striking operation, and stretched in a die to produce the flaring of the two side edges of the ring. Alternatively, the ring could be made by using flat strip stock, rolling the strip into a ring, overlapping and welding the ends together at W, as shown in Fig. 13 (or butt welding the engaged end faces of the ring at W, as shown in Fig. 14), removing excess weld and then placing the ring in a re-striking die to stretch and flare the two side edges of the ring.

Fig. 10 illustrates a device F preferably used to assemble the core ring 47 to the shell and vane assembly, the device comprising two hollow supporting and clamping fixtures 49 and 50, the fixture 49 being connected to the fixture 50 by guide and locating pins as shown. The vane and shell assembly is positioned within the cavity 50a of the lower fixture 50, the shell 19 surrounding and engaging loosely a pilot member 51 received within a recess in the bottom wall of the fixture 50 and seated, as at 52, on said bottom wall and fixed thereto by bolts 53. One edge of the shell engages, as at 54, the bottom wall of the fixture 50. A ring 55 is seated on the bottom wall of the fixture part 50 and is located concentric to the shell 19 by its engagement with an annular rib 56 on the side wall of the fixture 50. The ring has spaced diagonal portions 57 supporting and positioning a portion of the trailing edges 58 of the vanes.

A core ring 47 formed in the manner previously described, is heated to any suitable temperature causing it to expand sufficiently to allow it to pass over and surround the radially outer edges of the vanes. The heat-expanded core ring 47 is then positioned within the cavity of the fixture 50 so that one edge thereof rests on a shoulder 58a of the fixture 50. The upper fixture 49 is then quickly dropped down by means of a ram 59 connected thereto and operated by air or hydraulic pressure. Movement of the fixture 49 downwardly actuates a pressure pad 60 fitting within a cavity 61 in the fixture 49 and limited for movement relative thereto by shouldered bolts 62 threaded into the fixture 49, the pad 60 being normally seated against the heads of the bolts by the pressure exerted by springs 63 between the fixtures. Upon movement of the ram 59 downwardly, the spring-loaded pressure pad 60 will apply a light pressure on the front edge of the shell at 64. It will be noted that the rim 65 of the pad 60 is provided with spaced locating slots 66, each slot being formed to engage and position a portion of the front edge 67 of a vane 46. The amount of pressure that the ram 59 applies on the fixture 49 is sufficient to cause the outer rim of the fixture 56 to engage and apply a light pressure on the heated core ring 47.

It will be apparent that the positioning of the core ring 47 in the fixture 50 and the movement of the ram 59 downwardly is done very quickly before the heated core ring can cool to any appreciable extent. Consequently, upon cooling of the core ring, the core ring will shrink to tightly engage the radially outer edges of the vanes, while the vanes are held in accurate alignment by the pressure pad 60.

Upon cooling and while the core ring is still positioned between the fixtures, a plurality of radial punches (one of which is indicated at 68), slidably received within openings 69 in the fixture 50 disposed at an angle to the horizontal plane of the fixture 50, are then caused to move inwardly to indent the core ring at points just behind the trailing edges of the vanes 46. This operation will cause the metal of the core ring to be deformed to supply a plurality of protuberances or projections 70 on the ring extending between the vanes with each protuberance engaging one side of the trailing edge 58 of the adjacent vane, as shown in Figs. 7, 8 and 9. The protuberances 70 are required, as the pressure of the core ring upon cooling, causes the trailing edges of the vanes to tend to straighten out by movement of the trailing edges of the vanes in the direction indicated at X in Figs. 8 and 10, the protuberances 70 serving as abutments to prevent this movement of the trailing edge of the vanes. It will of course be readily apparent to those skilled in the art that it is imperative that the vanes of the stator be securely held with their initial curvatures in predetermined relationships in order that the vanes will provide satisfactory torque multiplication ratios and maximum efficiency, inasmuch as the curvatures of the vanes are effective to control the toroidal circulation of fluid in the torque converter to provide variable torque multiplication ratios. Accordingly, the curvatures of the vanes of the impeller, turbine, and stator must be calculated by involved hydraulic principles involving complex mathematical formulae to predetermine the most satisfactory curved characteristics of their vanes for obtaining the proper variable torque multiplication ratios, and it is then required that the vanes must be positively fixed to the shells and core rings of the vaned elements to prevent variation of the curvatures of the vanes in the assembly of the vanes, shells, and core rings.

An alternative procedure would be utilized for assembly of a split core ring to the vane and shell assembly shown in Fig. 10. The split ring 71, shown in Fig. 13, could be wrapped around the radially outer edges of the vanes and held clamped tightly to the vanes while a weld W was performed at the overlapping ends of the ring. After the welding operation, and while the ring retains the heat induced therein by such operation, the ring could be held clamped to the vanes, and, if desired, until the ring became cool with consequent shrinkage thereof to tightly engage the vanes. Upon clamping the heated ring on the vanes, it may be desirable that suitable staking tools could be used to indent the ring at spaced points to provide protuberances engaging the trailing edges of the vanes.

Figs. 15 to 19, inclusive, illustrate the invention is also applicable to vaned elements, such as stators, embodying airfoil-shaped vanes of variable thickness and preferably formed of aluminum. The stator, generally indicated at 72, may comprise a steel hub 73, and sheet metal shell 74 and core ring 75, substantially similar to that previously described with reference to the embodiment of the invention illustrated in Figs. 3 to 6, inclusive. The airfoil-shaped vanes are indicated at 76 and are preferably aluminum castings made either by die casting or plaster casting methods well-known in the art. Each vane 76 may have two, or more, tabs or positioning lugs 77 and 78 on its radially inner margin where the vane contacts the shell. The lugs 77 and 78 on the vanes may be of any desired configuration, such as a rectangular shape as shown in Figs. 15, 16 and 17, in which event, the tabs could have their corners rounded slightly and the sides might be tapered slightly to enable the tabs to be readily assembled into the similarly shaped slots 79 and 80 in the shell 74. If desired, the tabs might also be in the form of round bosses 81 and 82, as shown on the vanes 83 in Figs. 18 and 19, to fit within corresponding round holes in the stator shell. It may be noted that there are no tabs on the radially outer margin of each vane, which contacts the core ring.

The method of assembly of the hub, shell, core ring, and vanes of the stator, shown in Figs. 15 and 16, may be comparable to that used in assembling the component parts of the stator shown in Figs. 3–6, inclusive, as previously described, and comprising the steps of the tabs 77 and 78 of the vanes being positioned in the openings 79 and 80 in the shell 74, a metal strip being bent into circular form to provide an annular split band engaging the radially outer margins of the vanes, and then overlapping the ends of the strip and welding the ends as shown in Fig. 13, to provide the core ring 75. Alternatively, the ends of a metal strip could be engaged and butt-welded as shown in Fig. 14. Also, if desired, the core ring could be preformed as an endless one-piece member by various suitable means and then heated to expand the same to position the ring around the vanes, subsequent cooling of the ring causing the ring to shrink to tightly engage the radially outer margins of the vanes 76, this assembly operation being preferably accomplished by an assembly fixture comparable to that shown in Figs. 10 to 12, inclusive.

It is to be understood that although the embodiments of the invention illustrated are in connection with a vaned stator element of hydrodynamic couplings of the torque converting type, the invention is not to be limited to a stator element to the exclusion of vaned driving elements or impellers or driven vaned elements or turbines of such hydrodynamic couplings, unless the claims are so limited.

We claim:

1. In a method of fabricating a vaned element of a hydrodynamic coupling, the steps comprising providing an annular sheet metal shell having circumferentially spaced sets of axially spaced slots therein; providing a plurality of flexible curved sheet metal vanes with each vane having spaced tabs on each of the opposite margins thereof, the tabs on one margin of each vane being spaced apart a greater distance than the distance between the slots of each set in the shell; positioning the vanes radially outward of the shell and flexing the vanes to position the tabs on said one margin of each vane within the slots of the shell and to induce reaction forces in the vanes holding the same in engagement with the sides of the slots; providing a strip of metal having sets of slots therein spaced longitudinally thereof; positioning the tabs on the radially outer other margin of one of said vanes within the slots of the set at one end of the strip; bending the metal strip to insert the remaining tabs of the vanes successively within the slots of the other sets of the strip and to engage the radially outer margins of the vanes with the strip; overlapping the ends of the metal strip; welding together the ends of the metal strip; providing a cylindrical hub having axially spaced circular portions projecting from the outer surface thereof and defining an annular groove therebetween, the portions having serrations affording saw-like teeth; forcibly urging the hub axially of and into said shell to grippingly engage the teeth on said hub with the metal forming the inner surface of said shell; and indenting the shell at spaced points circumferentially thereof and adjacent the groove to cause the metal of the shell to protrude into the groove in said hub.

2. In a method of fabricating a vaned element of a hydrodynamic coupling, the steps comprising providing an annular shell having circumferentially spaced sets of axially spaced slots therein; providing a plurality of flexible curved sheet metal vanes with each vane having spaced tabs on each of the opposite margins thereof, the tabs on one margin of each vane being spaced apart a greater distance than the distance between the slots of each set in the shell; positioning the vanes radially outward of the shell and flexing the vanes to position the tabs on said one margin of each vane within the slots of the shell and to induce reaction forces in the vanes holding the same in engagement with the sides of the slots; providing a strip of metal having sets of slots therein spaced longitudinally thereof; positioning the tabs on the radially outer other margin of one of said vanes within the slots of the set at one end of the strip; bending the metal strip to insert the remaining tabs of the vanes successively within the slots of the other sets of the strip and to engage the radially outer margins of the vanes with the strip; overlapping the ends of the metal strip; welding together the ends of the metal strip.

3. In a method of fabricating a vaned element of a hydrodynamic coupling, the steps comprising providing an annular sheet metal shell having slots therein; providing a plurality of flexible curved sheet metal vanes with each vane having spaced tabs on each of the opposite margins thereof, the tabs on one margin of each vane being spaced apart a greater distance than the distance between the slots of each set in the shell; positioning the vanes radially outward of the shell and flexing the vane to position the tabs thereof on said one margin of the vanes within the slots of the shell and to induce reaction forces in the vanes holding the same in engagement with the sides of the slots; providing a strip of metal having spaced slots therein spaced longitudinally thereof; positioning the tabs on the radially outer margin of one of said vanes within the slots at one end of the strip; bending the metal strip to insert the remaining tabs of the vanes successively within the slots of the other sets of the strip and to engage the outer margin of the vanes with the strip; overlapping the ends of the metal strip; welding together the ends of the metal strip; providing a cylindrical hub having its outer surface provided with serrations affording axially extending saw-like teeth; and forcibly urging the hub axially of and into said shell to grippingly engage the teeth on said hub with the metal forming the inner surface of said shell.

4. In a method of fabricating a vaned element of a hydrodynamic coupling, the steps comprising providing an annular shell having axially spaced slots therein; providing a plurality of curved flexible vanes with each vane having spaced tabs on one of the opposite margins thereof and spaced apart a greater distance than the distance between the slots of each set; positioning the vanes radially outward of the shell and flexing the vanes to insert the tabs thereof within the slots of the shell and to induce reaction forces in the vanes holding the same in engagement and within the slots of the shell; holding the vanes and shell in assembly and against movement relative to each other; providing a metal ring; heating the ring to expand the same; placing the heat-expanded ring in surrounding relation to the radially outer margins of the vanes; and cooling the ring to contract the ring to tightly engage the ring with the radially outer margins of the vanes.

5. In a method of fabricating a vaned element of a hydrodynamic coupling, the steps comprising providing an annular shell having circumferentially spaced sets of axially spaced slots therein; providing a plurality of curved vanes of stamped flexible sheet metal having spaced sets of tabs on one of the opposite margins thereof and spaced apart a greater distance than the distance between the slots of each set; positioning the vanes radially outward of the shell and flexing the vane to insert the tabs thereof within the slots of the shell and to induce reaction forces in vanes holding the same in engagement with the slots; providing a strip of metal and bending the metal strip to provide a split ring engaging the other margin of the vanes; overlapping the ends of the metal strip; welding together the ends of the metal strip; and indenting the ring at spaced points to provide protuberances extending radially inwardly between the vanes with each protuberance engaging one of the two adjacent sides of the vanes between which the protuberance extends while cooling the ring to contract the ring to tightly engage the vanes.

6. In a method of fabricating a vaned element of a hydrodynamic coupling, the steps comprising providing an annular shell having spaced slots therein; providing a plurality of curved vanes of sheet metal having spaced sets of tabs on one of the opposite margins thereof, the spacing between said tabs slightly exceeding the spacing between said slots; positioning the vanes radially outward of the shell to insert the tabs thereof within the slots of the shell; providing a strip of metal and bending the metal strip to provide a split ring engaging the other margin of the vanes; overlapping the ends of the metal strip; welding together the ends of the metal strip; and indenting the ring at spaced points to provide protuberances extending radially inwardly between the vanes with each protuberance engaging one of the two adjacent sides of the vanes between which the protuberance extends while cooling the ring to contract the ring to tightly engage the vanes.

7. In a method of fabricating a vaned element of a hydrodynamic coupling, the steps comprising providing an annular shell forming a plurality of circumferentially axially extending pairs of slots in said shell; providing a plurality of curved vanes having tabs at the radially inward edge thereof, the spacing between said tabs slightly exceeding the spacing between said slots; positioning the vanes in circumferentially spaced relation about said shell; connecting the radially inner edges of the vanes to the shell; providing a metallic ring; heating the metallic ring to expand the ring; placing the heat-expanded ring in surrounding relation to the vanes; and indenting the ring at spaced points to provide protuberances extending radially inwardly between the vanes with each projection engaging one of the two adjacent sides of the vanes between which the projection extends while simultaneously cooling the ring to contract the ring to engage the radially outer margins of the vanes.

8. In a vaned element of a hydrodynamic coupling, an annular shell having axially spaced slots therein, a plurality of flexible curved vanes disposed radially outwardly of and flexed under tension to engage said shell and having a pair of tabs on the radially inner and outer edges thereof, the tabs on the inner edges of said vanes extending within the slots of said shell, said inner tabs having axially opposed inwardly directed outer side edges, the outer side edges of said inner tabs exerting a substantially axial force against the respective opposite ends of said shell slots to prevent vibration of said vanes; and a flexible metallic annular band surrounding said shell and vanes and engaging the radially outer edges of said vanes to prevent radial movement of said vanes and to hold said shell, vanes, and band in assembly, said band having circumferentially spaced sets of axially spaced slots therein receiving tabs on the radial outer edges of said vanes.

References Cited in the file of this patent

UNITED STATES PATENTS

| | | |
|---|---|---|
| 1,036,627 | Huguenin | Aug. 27, 1912 |
| 1,470,499 | Steenstrup | Oct. 9, 1923 |
| 1,551,342 | Steenstrup | Aug. 25, 1925 |
| 1,686,468 | Rosenberg | Oct. 2, 1928 |
| 1,775,055 | Tarbox et al. | Sept. 2, 1930 |
| 1,876,871 | Doman | Sept. 13, 1932 |
| 1,947,462 | Doorbar | Feb. 20, 1934 |
| 2,047,706 | Reed | July 14, 1936 |
| 2,061,997 | Dunn | Nov. 24, 1936 |
| 2,125,697 | Swingle et al. | Aug. 2, 1938 |
| 2,304,721 | Werther | Dec. 8, 1942 |
| 2,360,383 | Zeidler | Oct. 17, 1944 |
| 2,474,298 | Zeidler | June 28, 1949 |
| 2,503,025 | Bolender | Apr. 4, 1950 |
| 2,542,913 | Ensign | Feb. 20, 1951 |
| 2,556,676 | Carnegie | June 12, 1951 |
| 2,598,620 | Swift | May 27, 1952 |
| 2,630,090 | Haas | Mar. 3, 1953 |
| 2,692,561 | Zeidler | Oct. 26, 1954 |
| 2,692,562 | Zeidler | Oct. 26, 1954 |
| 2,696,171 | Jandasek et al. | Dec. 7, 1954 |

FOREIGN PATENTS

| | | |
|---|---|---|
| 4,603 | Great Britain | of 1905 |
| 623,149 | Great Britain | May 12, 1949 |